United States Patent
Wang

(10) Patent No.: US 11,132,547 B2
(45) Date of Patent: Sep. 28, 2021

(54) EMOTION RECOGNITION-BASED ARTWORK RECOMMENDATION METHOD AND DEVICE, MEDIUM, AND ELECTRONIC APPARATUS

(71) Applicant: BOE TECHNOLOGY GROUP CO., LTD., Beijing (CN)

(72) Inventor: Xueyun Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/639,008

(22) PCT Filed: Aug. 14, 2018

(86) PCT No.: PCT/CN2018/100318
§ 371 (c)(1),
(2) Date: Feb. 13, 2020

(87) PCT Pub. No.: WO2019/034026
PCT Pub. Date: Feb. 21, 2019

(65) Prior Publication Data
US 2020/0364457 A1    Nov. 19, 2020

(30) Foreign Application Priority Data
Aug. 15, 2017    (CN) .......................... 201710694834.0

(51) Int. Cl.
*G06K 9/00* (2006.01)
*G06K 9/62* (2006.01)
*G10L 25/63* (2013.01)

(52) U.S. Cl.
CPC ..... *G06K 9/00671* (2013.01); *G06K 9/00268* (2013.01); *G06K 9/00288* (2013.01);
(Continued)

(58) Field of Classification Search
CPC .......... G06K 9/00671; G06K 9/00268; G06K 9/00288; G06K 9/00302; G06K 9/6256;
(Continued)

(56) References Cited

U.S. PATENT DOCUMENTS

| | | | |
|---|---|---|---|
| 7,307,636 B2* | 12/2007 | Matraszek | G06F 16/58 345/581 |
| 2003/0093784 A1* | 5/2003 | Dimitrova | H04N 7/18 725/10 |

(Continued)

FOREIGN PATENT DOCUMENTS

| | | |
|---|---|---|
| CN | 103919537 | 7/2014 |
| CN | 105721936 | 6/2016 |

(Continued)

OTHER PUBLICATIONS

International Search Report and Written Opinion dated Nov. 8, 2018 for PCT Patent Application No. PCT/CN2018/100318.
(Continued)

*Primary Examiner* — Wesley J Tucker
(74) *Attorney, Agent, or Firm* — Thomas | Horstemeyer, LLP

(57) ABSTRACT

The present disclosure provides an emotion recognition-based artwork recommendation method and device. The method includes: obtaining a current biometric parameter of a user; determining a current emotion type of the user according to the current biometric parameter; selecting an image of an artwork corresponding to the current emotion type according to the current emotion type; and recommending an image of the artwork to the user by displaying the image of the artwork on the display screen.

11 Claims, 4 Drawing Sheets

S301 — When the user's current biometric parameters in different classifications are obtained, record durations in which the user is in different emotion types determined according to the biometric parameters in each classification S302 — Compare the durations corresponding to the different emotion types, and select an image of an artwork corresponding to an emotion type which corresponds to a maximum one of the durations and recommend the image of the artwork to the user for display

(52) U.S. Cl.
CPC ....... *G06K 9/00302* (2013.01); *G06K 9/6256* (2013.01); *G10L 25/63* (2013.01)

(58) Field of Classification Search
CPC ........ G06K 9/6292; G10L 25/63; A47G 1/06; G06N 3/0454; G06Q 30/0282
See application file for complete search history.

(56) References Cited

U.S. PATENT DOCUMENTS

| | | | | |
|---|---|---|---|---|
| 2010/0086215 | A1* | 4/2010 | Bartlett | G06K 9/00288 382/197 |
| 2014/0089399 | A1 | 3/2014 | Chun et al. | |
| 2015/0120704 | A1* | 4/2015 | Park | G06F 16/5866 707/722 |
| 2016/0104486 | A1* | 4/2016 | Penilla | G10L 15/005 704/232 |
| 2020/0125886 | A1* | 4/2020 | Baijal | G06K 9/00711 |
| 2021/0041953 | A1* | 2/2021 | Poltorak | G16H 30/40 |

FOREIGN PATENT DOCUMENTS

| | | |
|---|---|---|
| CN | 105956059 | 9/2016 |
| CN | 105975536 | 9/2016 |
| CN | 107424019 | 12/2017 |
| WO | 2014046762 | 3/2014 |

OTHER PUBLICATIONS

1st Office Action dated Apr. 17, 2019 for Chinese Patent Application No. 201710694834.0.
2nd Office Action dated Jun. 11, 2019 for Chinese Patent Application No. 201710694834.0.
Decision of Rejection dated Oct. 31, 2019 for Chinese Patent Application No. 201710694834.0.

* cited by examiner

EMOTION RECOGNITION-BASED ARTWORK RECOMMENDATION METHOD AND DEVICE, MEDIUM, AND ELECTRONIC APPARATUS

CROSS-REFERENCE OF RELATED APPLICATIONS

The present application is a § 371 national phase application of PCT/CN2018/100318 filed Aug. 14, 2018, which claims the benefit of and priority to Chinese Patent Application No. 201710694834.0, entitled "EMOTION RECOGNITION-BASED ARTWORK RECOMMENDATION METHOD AND DEVICE, MEDIUM, AND ELECTRONIC APPARATUS", filed on Aug. 15, 2017, the entire contents of which are incorporated herein by reference.

TECHNICAL FIELD

The present disclosure relates to computer technologies, and in particular, to an emotion recognition-based artwork recommendation method, an emotion recognition-based artwork recommendation device, and a computer-readable storage medium and electronic device for implementing the emotion recognition-based artwork recommendation method.

BACKGROUND

With the development of the social economy, quality of life is constantly improving, and more and more people have begun to study art. With the development of digital image processing technologies, a trend toward digitizing traditional paper-based images, paintings, and other works of art is becoming more and more popular.

At present, an electronic frame is slowly gaining popularity as a novel display device for the works of art. The electronic frame can be placed in various places, such as home, art exhibition hall or office, etc. The electronic frame can be used to display the works of art in the form of digital images, which is loved by the majority of users.

However, the intelligence degree of the existing electronic frames is low. Therefore, it is necessary to provide a new technical solution to address one or more problems in the above solutions.

It should be noted that the information disclosed in the Background section above is only for enhancing the understanding of the background of the present disclosure, and thus may include information that does not constitute prior art known to those of ordinary skill in the art.

SUMMARY

According to a first aspect of embodiments of the present disclosure, an emotion recognition-based artwork recommendation method is provided. The method may be applied in an electronic device having a display screen. The method includes:

obtaining a current biometric parameter of a user, and determining a current emotion type of the user according to the current biometric parameter; and selecting an image of an artwork corresponding to the determined current emotion type according to the determined current emotion type, and recommending an image of the artwork to the user by displaying the image of the artwork on the display screen.

In an exemplary embodiment of the present disclosure, the method further includes:

before obtaining the current biometric parameter of the user, performing classification training processing on a plurality of biometric parameters of the user based on a deep learning algorithm to obtain an emotion classification model;

determining a current emotion type of the user according to the current biometric parameter includes:

performing processing on the current biometric parameter according to the emotion classification model to determine the current emotion type of the user In an exemplary embodiment of the present disclosure, the plurality of biometric parameters include a plurality of biometric parameters in different classifications;

performing classification training processing on a plurality biometric parameters based on a deep learning algorithm to obtain an emotion classification model includes:

performing the classification training processing on the plurality of biometric parameters belonging to the classification based on the deep learning algorithm, so as to obtain a plurality of different emotion classification sub-models correspondingly;

performing processing on the current biometric parameter according to the emotion classification model to determine the current emotion type of the user includes:

determining a classification of the current biometric parameter, and selecting a corresponding emotion classification sub-model to process the current biometric parameter according to a classification determination result, so as to determine the current emotion type of the user.

In an exemplary embodiment of the present disclosure, the method further includes:

when a plurality of different classifications of current biometric parameters of a user are obtained, recording durations in which the user is in different emotion types determined according to the biometric parameters in each classification;

selecting an image of an artwork corresponding to the current emotion type and recommending the image of the artwork to the user by displaying the image of the artwork on the display screen, which includes:

comparing the durations corresponding to the different emotion types, and selecting an image of an artwork corresponding to an emotion type which corresponds to a maximum one of the durations and recommending the image of the artwork to the user by displaying the image of the artwork on the display screen.

In an exemplary embodiment of the present disclosure, the plurality of biometric parameters in different classifications include facial feature parameters and sound feature parameters.

In an exemplary embodiment of the present disclosure, the method further includes:

recommending a selected image of the artwork to the user for display according to a preset time frequency.

In an exemplary embodiment of the present disclosure, the method further includes:

when no emotion type is determined, recommending a related image of an artwork to the user according to the user's historical data.

In an exemplary embodiment of the present disclosure, the deep learning algorithm includes a convolutional neural network deep learning algorithm.

In an exemplary embodiment of the present disclosure, the method further includes:

after obtaining the current biometric parameter of the user, verifying validity of an identity of the user according to the current biometric parameter.

According to a second aspect of the embodiments of the present disclosure, an electronic device is provided. The electronic device includes:

a body; a display provided on the body and configured to display an image of an artwork; a biometric feature collection device provided on the body and configured to collect a biometric feature parameter of a user; a processor (e.g., a hardware processor); a memory for storing instructions executable by the processor; and wherein the processor is configured to:

select an image of an artwork corresponding to the current emotion type according to the current emotion type, and recommend an image of the artwork; wherein the display is configured to display the image of the artwork.

In an exemplary embodiment of the present disclosure, the processor is further configured to:

before the current biometric parameter of the user is obtained, perform classification training processing on a plurality of biometric parameters of the user based on a deep learning algorithm to obtain an emotion classification model;

perform processing on the current biometric parameter according to the emotion classification model to determine the current emotion type of the user.

In an exemplary embodiment of the present disclosure, the plurality of biometric parameters include a plurality of biometric parameters in different classifications;

the processor is further configured to perform the classification training processing on the plurality of biometric parameters belonging to the classification based on the deep learning algorithm, so as to obtain a plurality of different emotion classification sub-models correspondingly;

the processor is further configured to determine a classification of the current biometric parameter, and select a corresponding emotion classification sub-model to process the current biometric parameter according to a classification determination result, so as to determine the current emotion type of the user.

In an exemplary embodiment of the present disclosure, the processor is further configured to:

when a plurality of different classifications of current biometric parameters of a user are obtained, record durations in which the user is in different emotion types determined according to the biometric parameters in each classification;

the processor is further configured to compare the durations corresponding to the different emotion types, and select an image of an artwork corresponding to an emotion type which corresponds to a maximum one of the durations and recommending the image of the artwork to the user by displaying the image of the artwork on the display screen.

In an exemplary embodiment of the present disclosure, the processor is further configured to:

recommend a selected image of the artwork to the user for display according to a preset time frequency.

In an exemplary embodiment of the present disclosure, the plurality of biometric parameters in different classifications include facial feature parameters and sound feature parameters.

In an exemplary embodiment of the present disclosure, the processor is further configured to:

when no emotion type is determined, recommend a related image of an artwork to the user according to the user's historical data.

In an exemplary embodiment of the present disclosure, the processor is further configured to:

verify validity of an identity of the user according to the current biometric parameter after the user's current biometric parameter is obtained.

According to a third aspect of the embodiments of the present disclosure, there is provided a non-transitory computer readable storage medium having a computer program stored thereon. When executed by a processor, the program causes the process to implement steps of the emotion recognition-based artwork recommendation method according to one of the above embodiments.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure. It is understood that the drawings in the following description show only some of the embodiments of the present disclosure, and other drawings may be obtained by those skilled in the art without departing from the drawings described herein.

DETAILED DESCRIPTION

Figure 1:
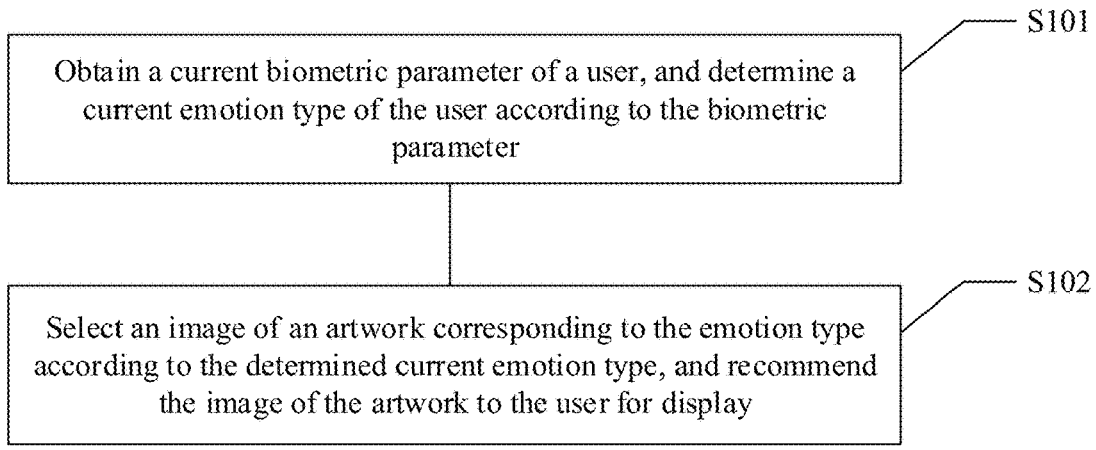
FIG. 1 schematically shows a flowchart of an emotion recognition-based artwork recommendation method according to an exemplary embodiment of the present disclosure.

Example embodiments will now be described more fully with reference to the accompanying drawings. However, the embodiments can be implemented in a variety of forms and should not be construed as being limited to the examples set forth herein; rather, these embodiments are provided so that this disclosure will be more complete so as to convey the idea of the exemplary embodiments to those skilled in this art. The described features, structures, or characteristics in one or more embodiments may be combined in any suitable manner.

In addition, the drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily correspond to physically or logically separate entities. These functional entities may be implemented in software, or implemented in one or more hardware modules or integrated circuits, or implemented in different networks and/or processor devices and/or microcontroller devices.

Existing electronic frames are used only for displaying artworks, or can recommend an artwork most viewed by a user according to a viewing history of the user. The intelligence level of existing electronic frames is low, and most of the recommendations are based on commercial value, which is not user-friendly. In view of the above problems, the present disclosure provides an emotion recognition-based artwork recommendation method, an emotion recognition-based artwork recommendation device, a computer-readable storage medium and electronic device for implementing the emotion recognition-based artwork recommendation method.

An exemplary embodiment provides an emotion recognition-based artwork recommendation method. The method can be applied to an electronic device with a display screen, such as an electronic frame. Embodiments of the present disclosure are described below taking the electronic frame as an example, but the present disclosure is not limited to this. The electronic frame may include, for example, a rectangular frame, a display, a microphone, a camera, and the like (not shown). The display may be arranged in the frame and configured to display an image of an artwork such as a painting. The microphone and camera may be provided on the edge(s) of the frame and configured to collect biometric parameters of a user, such as the user's sound features and facial image features, etc. Referring to FIG. 1, the method may include the following steps:

In step S101, a current biometric parameter of a user is obtained, and a current emotion type of the user is determined according to the biometric parameter.

In step S102, an image of an artwork corresponding to the emotion type is selected according to the determined current emotion type, and the image of the artwork is recommended to the user for display.

Through the above emotion recognition-based artwork recommendation method, the technical solutions according to the embodiments of the present disclosure can intelligently determine the user's current different emotions and then recommend correspondingly different artwork images, and thus the technical solutions according to embodiments of the present disclosure are highly intelligent and more user-friendly. Accordingly, the corresponding products such as the electronic frame, and so on can understand the user better and become friends in the user's life.

Hereinafter, each step of the above methods according to the exemplary embodiment will be described in more detail with reference to FIGS. 1 to 5.

In step S101, a current biometric parameter of a user is obtained, and a current emotion type of the user is determined according to the biometric parameter.

According to an exemplary embodiment, the biometric parameters may include, but are not limited to, facial feature parameters, or sound feature parameters. For example, the microphone and the camera on the electronic frame may be used to collect the biometric parameters of the user such as the sound feature parameters and the facial feature parameters, respectively. The emotion type may include, but is not limited to, depression, anger, happiness, and the like. The different types of emotions may be determined in advance by deep learning at least one of the facial feature parameters and sound feature parameters of a user with a large number through the deep learning algorithm.

For example, the current facial feature of the user may be obtained, and the current emotional type of the user, such as anger, may be determined according to the facial feature.

In an exemplary embodiment of the present disclosure, the method may further include: after the user's current biometric parameter is obtained, verifying validity of an identity of the user according to the biometric parameter. For example, the current user's facial feature or sound feature is compared with the corresponding pre-stored facial feature or sound feature to verify whether the current user's identity is valid. If the identity of the current user is valid, the subsequent step of determining the emotion type is continued, and if the identity of the current user is not valid, the subsequent step is not performed, and re-verification of the identity of the user is performed.

Figure 2:
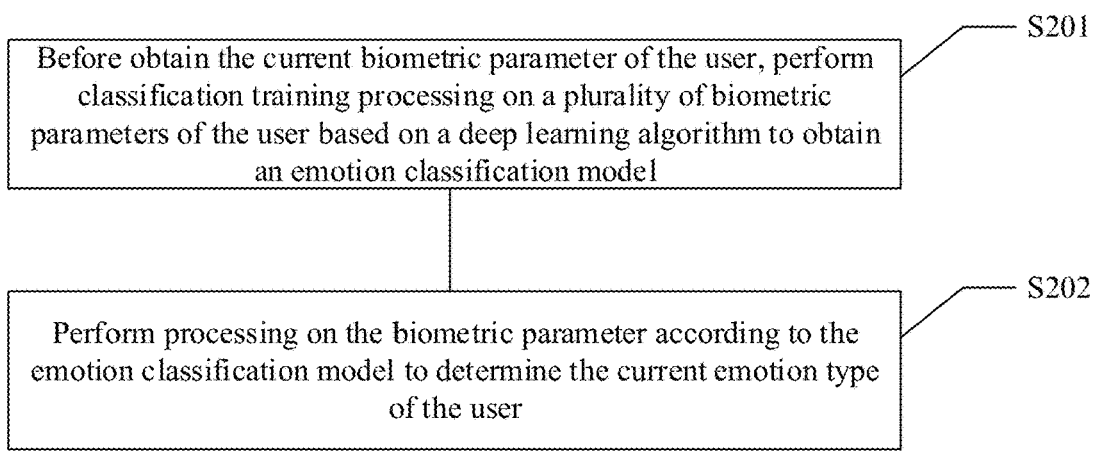
FIG. 2 schematically shows another flowchart of an emotion recognition-based artwork recommendation method according to an exemplary embodiment of the present disclosure.

As shown in FIG. 2, in order to set the emotion type in advance, in an exemplary embodiment of the present disclosure, the method may further include the following steps:

In step S201, before the current biometric parameter of the user is obtained, classification training processing is performed on a plurality of biometric parameters of the user based on a deep learning algorithm to obtain an emotion classification model.

In this embodiment, for example, before the current facial feature of the user is obtained, the classification training processing is performed on a plurality of biometric parameters of the user based on a convolutional neural network deep learning algorithm to obtain an emotion classification model. For example, the classification training processing is performed on a plurality of facial features to obtain a corresponding emotion classification model of the user, such as a model corresponding to the emotion of anger.

In step S202, processing is performed on the biometric parameter according to the emotion classification model to determine the current emotion type of the user.

For example, based on a pre-trained emotion classification model corresponding to, for example the user's angry emotion, the current facial feature of the user may be processed to determine the current emotion type of the user. For example, the current emotion type is determined to be angry.

Further, in another exemplary embodiment of the present disclosure, the biometric parameters include a plurality of biometric parameters in different classifications such as facial feature parameter and a sound feature parameter. In the step S201, the step of performing classification training processing on a plurality of biometric parameters based on a deep learning algorithm to obtain an emotion classification model may include: for biometric parameters belonging to each classification, performing the classification training processing on the biometric parameters belonging to the classification based on the deep learning algorithm (such as a convolutional neural network deep learning algorithm), so as to obtain a plurality of different emotion classification sub-models correspondingly.

For example, the classification training processing can be performed on a large number of the user's facial features based on the convolutional neural network deep learning algorithm to obtain for example facial emotion classification sub-models. Also, the classification training processing can be performed on a large number of the user's sound features based on the convolutional neural network deep learning algorithm to obtain, for example sound emotion classification sub-models. Specifically, the deep learning-based algorithm may first collect a large amount of sample data, such as a face and sound feature segments with emotion tags, and the tags may include, but are not limited to, the following four tags: sadness, anger, happiness, and emotionlessness. Then, the convolutional neural network (CNN) deep learning algorithm can be used to process and classify the facial features to obtain a facial emotion classification sub-model. Similarly, the CNN deep learning algorithm can be used to process and classify the sound features to obtain a sound emotion classification sub-model.

In step S202, the step of performing processing on the biometric parameter according to the emotion classification model to determine the current emotion type of the user includes: determining a classification of the current biometric parameter, and selecting a corresponding emotion classification sub-model to process the current biometric parameter according to a classification determination result so as to determine the current emotion type of the user.

For example, when it is determined that the current biometric parameter is the facial feature parameter, the facial feature parameter may be processed according to the facial emotion classification sub-model, so as to determine the current emotion type of the user. When it is determined that the current biometric parameter is the sound feature parameter, the sound feature parameter may be processed according to a sound emotion classification sub-model, so as to determine the current emotion type of the user. This allows targeted processing and improves processing efficiency.

In step S102, an image of an artwork corresponding to the emotion type is selected according to the determined current emotion type, and is recommended to the user for display.

Figure 4:
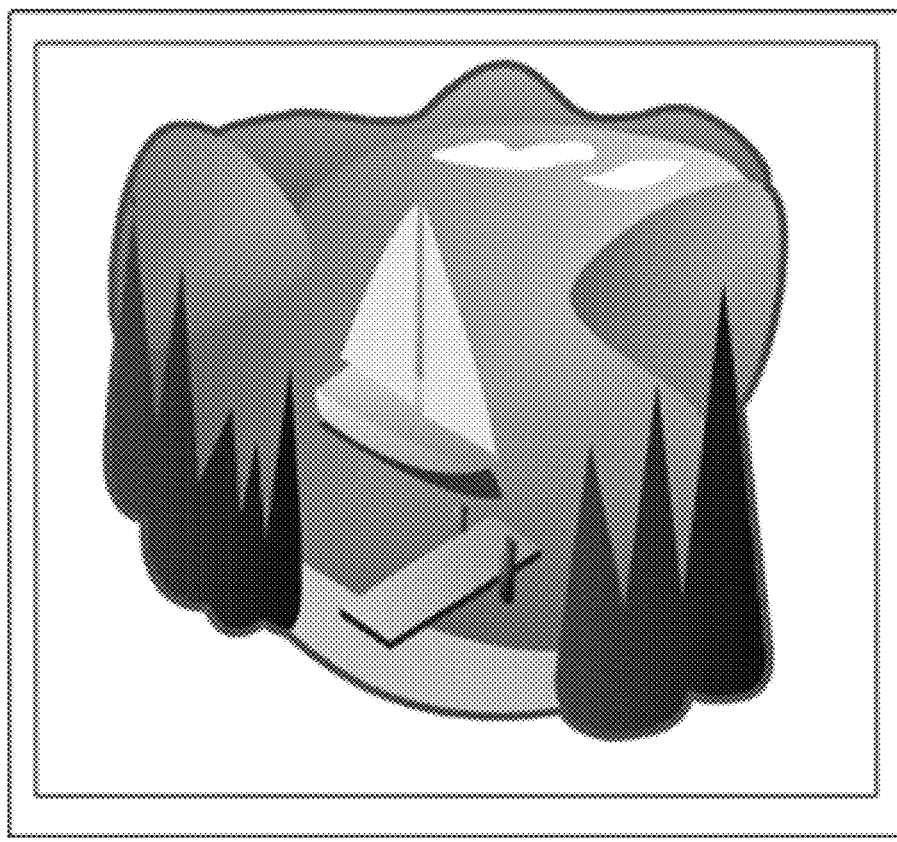
FIG. 4 schematically shows an image of an artwork according to an exemplary embodiment of the present disclosure.
Figure 5:
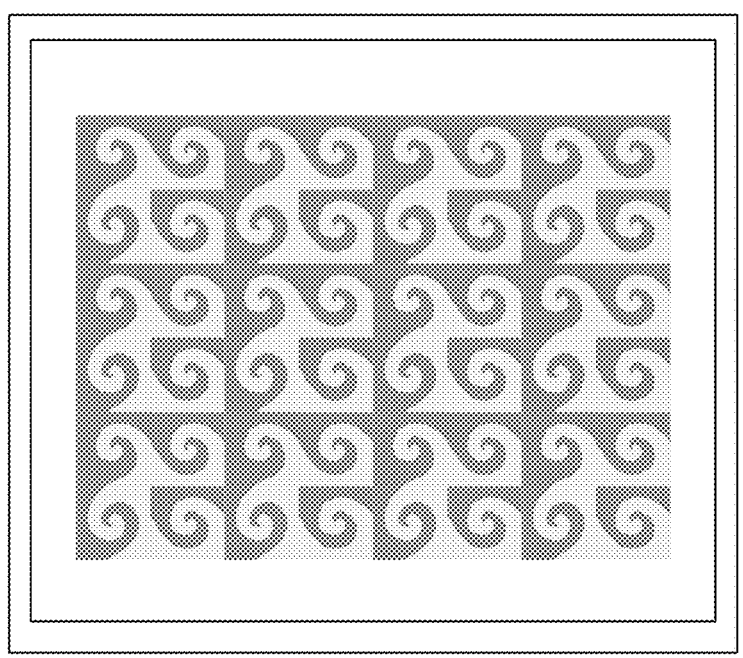
FIG. 5 schematically shows another image of an artwork according to an exemplary embodiment of the present disclosure.

According to an exemplary embodiment, different images of the corresponding artworks, such as the image of a paining can be recommended according to the determined current emotion type of the user, as shown in FIGS. 4 and 5. For example, if the user's emotion is depression, a paining which can give the user a positive mood, such as a work depicting an upward sunflower, can be recommended. If the user's emotion is angry, a paining which can give the user calm and peace, such as a work depicting the blue sea, can be recommended to stabilize the user's emotion. If the user's emotion is happy, the user is inclined to buy things at this time, and a painting most likely to be purchased by the user can be recommended according to the viewing history of the user. The present disclosure is not limited to the above examples.

According to an exemplary embodiment of the present disclosure, the method may further include the step of recommending the selected image of the artwork to the user for display according to a preset time frequency.

For example, the time frequency of recommending an artwork can be set to be 3 days, etc., and the users can also reset the time frequency according to their own preferences. A new painting can be recommended to the user every 3 days, for example.

According to another exemplary embodiment of the present disclosure, the method may further include the following step: recommending a related image of an artwork according to the user's historical data to the user, when no emotion type is determined. For example, if the user's emotion is not detected, that is, when the emotion type is emotionless, the recommendation mode is used, and a related artwork is recommended to the user according to the user's historical viewing data. The intelligent electronic frame itself can have a recommendation system based on contents of works, which can record the user's historical viewing data.

Figure 3:
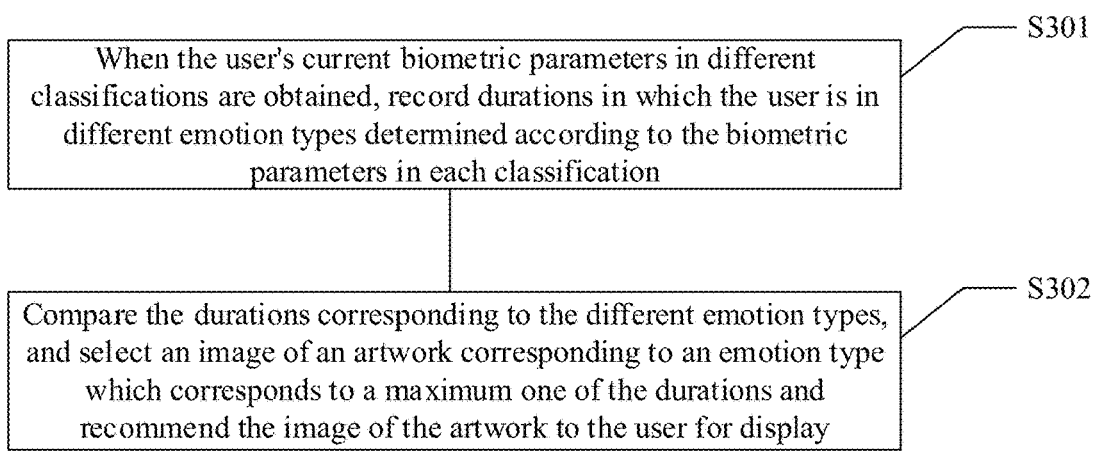
FIG. 3 schematically shows still another flowchart of an emotion recognition-based artwork recommendation method according to an exemplary embodiment of the present disclosure.

There may be following scenarios. If the user has multiple emotions in a certain period of time, how to recommend an artwork, or how to recommend a reasonable work to the user within the above-mentioned update period of the works, such as 3 days, is determined. Based on the above embodiments, in another exemplary embodiment of the present disclosure, as shown in FIG. 3, the method may further include the following steps:

In step S301, when the user's current biometric parameters in different classifications are obtained, durations in which the user is in different emotion types determined according to the biometric parameters in each classification are recorded.

For example, according to the different emotion classification sub-models, different current emotion types of the user are determined, the duration in which the user is in each emotion type is recorded. That is, the emotions are classified and the duration in which the user in each emotion type is saved. For example, the duration of the anger emotion, the duration of the depression emotion and the duration of the happy emotion are saved.

In step S302, the durations corresponding to the different emotion types are compared, and an image of an artwork corresponding to an emotion type which corresponds to a maximum one of the durations is selected and the selected image of the artwork is recommended to the user for display.

For example, if works shown on the electronic frame need to be updated next time, the electronic frame can calculate the emotional energy of each emotion type according to the previous user's emotion classification. It is assumed that the unit energy of various emotions is equal, the emotional energy is simplified to accumulation of time. Therefore, based on the duration of each type of emotion described above, the emotion type of the user that has the longest duration, that is, the emotion type having the greatest emotional energy may be selected, and a paining corresponding to the emotion having the greatest emotional energy is recommended to the user.

Specifically, emotional energies of four emotion types are determined, and the one with the greatest emotional energy is taken as the recommendation basis. For example, if the user's emotion is depression, a paining which can give the user a positive mood, such as a work depicting an upward sunflower, can be recommended. If the user's emotion is angry, a paining which can give the user calm and peace, such as a work depicting the blue sea, can be recommended to stabilize the user's emotion. If the user's emotion is happy, the user is inclined to buy things at this time, and a painting most likely to be purchased by the user can be recommended according to the viewing history of the user. If the user's emotions are not detected, then the paining that the user is most interested in is recommended according to the user's viewing history.

In the technical solutions according to embodiments of the present disclosure, emotion classification can be performed based on the deep learning, and the emotion type of the user, such as anger, sadness, happy, etc. and be determined, thereby intelligently recommending a reasonable image to the user based on different emotion types. The technical solutions according to embodiments of the present disclosure can understand the user better, so that the electronic frame such as the iGallery art frame can become friends of the user in daily life and are user friendly. The electronic frame is not only an artwork, but also the expert in emotional balance. The user has more than just an art frame, but also psychological healing and pleasure. In addition, the artistic update method of the intelligent electronic frame can be set to be automatic and manual modes. If the manual mode is set, the user manually selects his/her favorite work. If an automatic mode is set, the solutions according to the above exemplary embodiments can be used, and the electronic frame can automatically push new works to the user every certain time.

It should be noted that although various steps of methods of the present disclosure are described in a particular order in the figures, it is not required or implied that the steps must be performed in the specific order, or all the steps shown must be performed to achieve the desired result. Additionally or alternatively, certain steps may be omitted, multiple steps may be combined into one step, and/or one step may be decomposed into multiple steps and so on. In addition, it is also easy to understand that these steps may be performed synchronously or asynchronously in multiple modules/processes/threads, for example.

Figure 6:
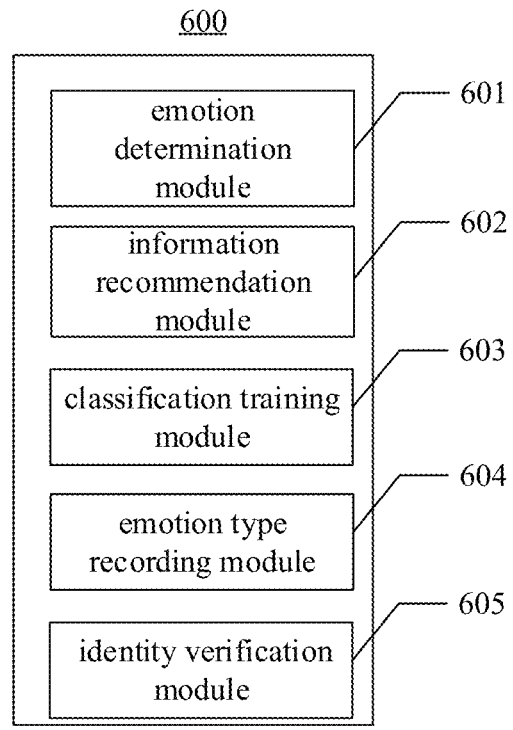
FIG. 6 schematically shows a schematic diagram of an emotion recognition-based artwork recommendation device according to an exemplary embodiment of the present disclosure.

An exemplary embodiment provides an emotion recognition-based artwork recommendation device. The device may be provided in, for example, an electronic frame, and may be set in a processor of the electronic frame in a form of instruction codes. Referring to FIG. 6, the device 600 may include an emotion determination module 601 and an information recommendation module 602.

The emotion determination module 601 is configured to obtain a current biometric parameter of a user, and determine a current emotion type of the user according to the biometric parameter.

In an exemplary embodiment of the present disclosure, the biometric parameters may include, but are not limited to, facial feature parameters, or sound feature parameters. For example, the emotion determination module 601 can be the microphone and the camera provided on the electronic frame for collecting the biometric parameters such as the sound feature parameters and the facial feature parameters of the user, respectively. The emotion determination module 601 may also be a sound sensor and a camera provided on the electronic frame for collecting the biometric parameters such as the sound feature parameters and the facial feature parameters of the user, respectively.

The information recommendation module 602 is configured to select an image of an artwork corresponding to the emotion type according to the determined current emotion type, and recommend the image of the artwork to the user for display.

In an exemplary embodiment of the present disclosure, the device may further include a classification training module 603 configured to, before the current biometric parameter of the user is obtained, perform classification training processing on a plurality of biometric parameters of the user based on a deep learning algorithm to obtain an emotion classification model. The emotion determination module 601 may be further configured to perform processing on the biometric parameter according to the emotion classification model to determine the current emotion type of the user.

In an exemplary embodiment of the present disclosure, the biometric parameters may include, but are not limited to, a plurality of biometric parameters in different classifications. The classification training module 603 may be further configured to, for biometric parameters belonging to each classification, perform the classification training processing on the biometric parameters belonging to the classification based on the deep learning algorithm, so as to obtain a plurality of different emotion classification sub-models correspondingly. The emotion determination module 601 may be further configured to determine a classification of the current biometric parameter, and select a corresponding emotion classification sub-model to process the current biometric parameter according to a classification determination result, so as to determine the current emotion type of the user.

In an exemplary embodiment of the present disclosure, the device may further include an emotion type recording module 604 configured to, when the user's current biometric parameters in different classifications are obtained, record durations in which the user is in different emotion types determined according to the biometric parameters in each classification. The information recommendation module 602 may be further configured to compare the durations corresponding to the different emotion types, and select an image of an artwork corresponding to an emotion type which corresponds to a maximum one of the durations and recommend the image of the artwork to the user for display.

In the above-mentioned exemplary embodiments of the present disclosure, the biometric parameters in different classifications may include, but are not limited to, facial feature parameters and sound feature parameters.

In an exemplary embodiment of the present disclosure, the device may further include a first artwork recommendation module configured to recommend the selected image of the artwork to the user for display according to a preset time frequency.

In an exemplary embodiment of the present disclosure, the device may further include a second artwork recommendation module configured to recommend a related image of an artwork according to the user's historical data to the user, when no emotion type is determined.

In an exemplary embodiment of the present disclosure, the deep learning algorithm may include, but is not limited to, a convolutional neural network deep learning algorithm.

In an exemplary embodiment of the present disclosure, the device may further include an identity verification module 605 configured to, after the user's current biometric parameter is obtained, verify validity of an identity of the user according to the current biometric parameter.

Regarding the devices in the above embodiments, the specific manner in which each module performs operations has been described in detail in the method embodiments, and will not be described in detail here.

It should be noted that although modules or units of devices for executing functions are described above, such division of modules or units is not mandatory. In fact, features and functions of two or more of the modules or units described above may be embodied in one module or unit in accordance with the embodiments of the present disclosure. Alternatively, the features and functions of one module or unit described above may be further divided into multiple modules or units. The components displayed as modules or units may or may not be physical units, may be located in one place, or may be distributed over multiple network units. Some or all of these modules can be selected to achieve the purpose of the present disclosure according to actual needs. Those of ordinary skill in the art can understand and implement the present disclosure without creative work.

In an exemplary embodiment of the present disclosure, there is also provided a non-transitory computer-readable storage medium having stored thereon a computer program which, when executed by a processor, causes the process to implement steps of the emotion recognition-based artwork recommendation method described in any one of the above embodiments. In some possible implementations, aspects of the present disclosure may also be implemented in the form of a program product, which includes program codes. When the program product runs on a terminal device such as an electronic frame, the program codes are used to cause the terminal device to perform the steps according to various exemplary embodiments of the present disclosure described in the emotion recognition-based artwork recommendation methods of the present disclosure.

Figure 7:
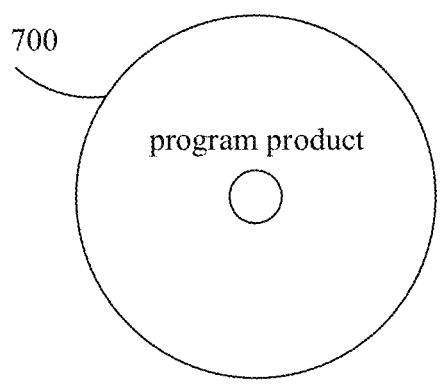
FIG. 7 schematically shows a schematic diagram of a computer readable storage medium according to an exemplary embodiment of the present disclosure.

FIG. 7 shows a program product 700 for implementing the above method according to an embodiment of the present disclosure. The program product may adopt a portable compact disc read-only memory (CD-ROM) and include program codes, and may be run on a terminal device, such as the electronic frame. However, the program product of the present disclosure is not limited thereto. The readable storage medium may be any tangible medium containing or storing a program, and the program may be used by an instruction execution system, apparatus, or device or may be used in combination with an instruction execution system, apparatus, or device.

The program product may employ any combination of one or more readable media. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive list) of the readable storage media include: an electrical connection with one or more wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The computer-readable storage medium may include a data signal in baseband or propagated as part of a carrier wave, in which a readable program code is carried. This propagated data signal can take many forms, including but not limited to electromagnetic signals, optical signals, or any suitable combination of the foregoing. The readable storage medium may also be any readable medium other than a readable storage medium, and the readable medium may send, transfer, or transmit a program for use by or in connection with an instruction execution system, apparatus, or device. The program code contained on the readable storage medium may be transmitted using any appropriate medium, including but not limited to wireless, wired, optical fiber cable, RF, etc., or any suitable combination of the foregoing.

The program code for performing the operations of the present disclosure may be written in any combination of one or more programming languages, which include object-oriented programming languages, such as Java, C++, etc. and also include conventional procedural programming language, such as "C" or a similar programming language. The program code can be executed entirely on the user computing device, partly on the user device, executed as an independent software package, executed partly on the user computing device and partly on the remote computing device, or executed entirely on the remote computing device or server. In the case of a remote computing device, the remote computing device can be connected to the user computing device through any kind of network, including a local area network (LAN) or a wide area network (WAN), or may be connected to an external computing device (for example, using an Internet service provider to connect through the Internet).

In an exemplary embodiment of the present disclosure, there is also provided an electronic device, which may include a processor, and a memory for storing instructions executable by the processor. The processor is configured to execute the instructions to implement steps of the emotion recognition-based artwork recommendation methods in any one of the foregoing embodiments.

In an exemplary embodiment of the present disclosure, the electronic device may further include a body, a display part and a biometric feature collection device. The body is, for example, a rectangular frame body. The display part is provided on the body. For example, the display part is embedded in the rectangular frame body, and configured to display an image of an artwork. The biometric feature collection device is also provided on the body, for example, on a frame of the rectangular frame body, and is configured to collect biometric feature parameters of a user.

For example, the electronic device may be an electronic frame. The artworks of different color styles can be stored in the memory in advance, such as the images of the paintings. The display part may include, but is not limited to, a display device such as an LED display, an LCD display, or an OLED display, which may display the images of the artworks, for example the images of the paintings. The biometric collection device may include, but is not limited to, a microphone and a camera. The microphone and the camera may respectively collect the user's sound features and the facial image features. In this way, after the biometric features are processed by the processor, paintings of different colors and styles can be selected and recommended to the user according to the different current emotions of the user.

Those skilled in the art can understand that various aspects of the present disclosure may be implemented as a system, a method, or a program product. Therefore, various aspects of the present disclosure can be embodied in the following forms: a complete hardware implementation, a complete software implementation (including a firmware, a microcode, etc.), or a combination of the hardware and the software, which can be collectively referred to as "circuit", "module" or "system".

An electronic device 800 according to this embodiment of the present disclosure is described below with reference to FIG. 8. The electronic device 800 shown in FIG. 8 is merely an example, and should not impose any limitation on the functions and range of application of the embodiments of the present disclosure.

Figure 8:
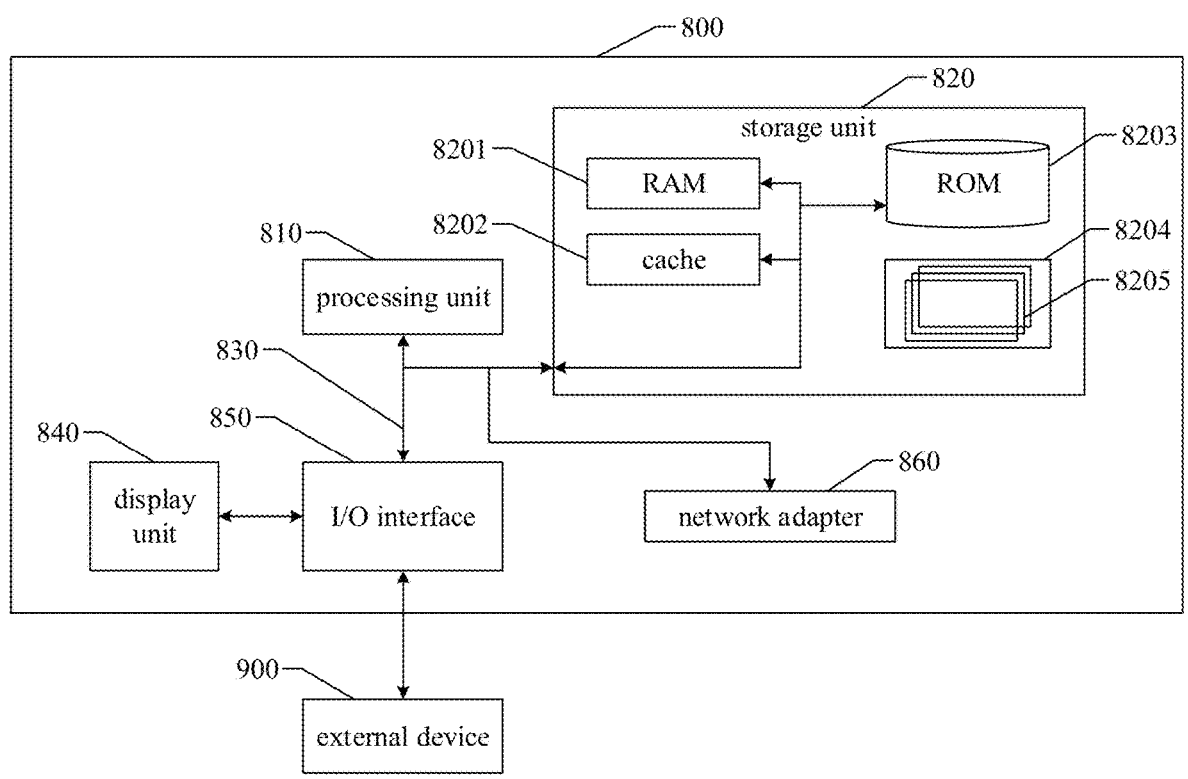
FIG. 8 schematically shows a schematic diagram of an electronic device according to an exemplary embodiment of the present disclosure.

As shown in FIG. 8, the electronic device 800 is implemented in the form of a general-purpose computing device. The components of the electronic device 800 may include, but are not limited to, at least one processing unit 810, at least one storage unit 820, a bus 830 connecting different system components (including the storage unit 820 and the processing unit 810), a display unit 840, and the like.

The storage unit stores program codes, and the program codes can be executed by the processing unit 810, so that the processing unit 810 executes the steps of the emotion recognition-based artwork recommendation methods according to various exemplary embodiments of the present disclosure. For example, the processing unit 810 may perform steps as shown in FIG. 1.

The storage unit 820 may include a readable medium in the form of a volatile storage unit, such as a random access storage unit (RAM) 8201 and/or a cache storage unit 8202, and may further include a read-only storage unit (ROM) 8203.

The storage unit 820 may further include a program/utility tool 8204 having a set of (at least one) program modules 8205. Such program modules 8205 include, but are not limited to, an operating system, one or more applications, other program modules, and program data. Each of these examples or some combination may include an implementation of the network environment.

The bus 830 may be one or more of several types of bus structures, including a memory unit bus or a memory unit controller, a peripheral bus, a graphics acceleration port, a processing unit, or a local bus using any of a variety of bus structures.

The electronic device 800 may also communicate with one or more external devices 900 (such as a keyboard, a pointing device, a Bluetooth device, etc.), and may also communicate with one or more devices that enable the user to interact with the electronic device 800, and/or communicate with any device (such as a router, a modem, etc.) that enables the electronic device 800 to communicate with one or more other computing devices. This communication can be performed through an input/output (I/O) interface 850. Moreover, the electronic device 800 can also communicate with one or more networks (such as a local area network (LAN), a wide area network (WAN), and/or a public network, such as the Internet) through the network adapter 860. The network adapter 860 may communicate with other modules of the electronic device 800 through the bus 830. It should be understood that although not shown in the figure, other hardware and/or software modules may be used in conjunction with the electronic device 800, including but not limited to: microcode, a device driver, a redundant processing unit, an external disk drive array, a RAID system, a tape drive and a data backup storage system.

Through the description of the above embodiments, those skilled in the art will readily understand that the exemplary embodiments described herein may be implemented by software or by a combination of software with necessary hardware. Therefore, the technical solutions according to embodiments of the present disclosure may be embodied in the form of a software product, which may be stored in a non-volatile storage medium (which may be a CD-ROM, a USB flash drive, a mobile hard disk, etc.) or on a network. A number of instructions are included to cause a computing device (which may be a personal computer, server) to perform the above emotion recognition-based artwork recommendation methods in accordance with the embodiments of the present disclosure.

Other embodiments of the present disclosure will be apparent to those skilled in the art. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope of the present disclosure is defined by the appended claims.

What is claimed is:

1. An emotion recognition-based artwork recommendation method, applied in an electronic device having a display screen, wherein the method comprises:
    before obtaining a current biometric parameter of a user, performing classification training processing on a plurality of biometric parameters of the user in different classifications based on a deep learning algorithm to obtain an emotion classification model, wherein performing classification training processing on the plurality of biometric parameters based on the deep learning algorithm to obtain the emotion classification model comprises performing the classification training processing on the plurality of biometric parameters belonging to the classification based on the deep learning algorithm, so as to obtain a plurality of different emotion classification sub-models, correspondingly;
    obtaining the current biometric parameter of the user;
    determining a current emotion type of the user according to the current biometric parameter by performing processing on the current biometric parameter according to the emotion classification model, wherein performing processing on the current biometric parameter according to the emotion classification model to determine the current emotion type of the user comprises determining a classification of the current biometric parameter, and selecting a corresponding emotion classification sub-model to process the current biometric parameter according to a classification determination result, so as to determine the current emotion type of the user;
    when a plurality of different classifications of current biometric parameters of the user are obtained, recording durations in which the user is in different emotion types determined according to the biometric parameters in each classification;
    selecting an image of an artwork corresponding to the current emotion type according to the determined current emotion type by comparing the durations corresponding to the different emotion types, and selecting the image of the artwork corresponding to an emotion type which corresponds to a maximum one of the durations; and
    recommending an image of the artwork to the user by displaying the image of the artwork on the display screen.

2. The emotion recognition-based artwork recommendation method according to claim 1, wherein the plurality of biometric parameters in different classifications comprise facial feature parameters and sound feature parameters.

3. The emotion recognition-based artwork recommendation method according to claim 2, wherein the method further comprises: recommending a selected image of the artwork to the user for display according to a preset time frequency.

4. The emotion recognition-based artwork recommendation method according to claim 2, wherein the method further comprises: when no emotion type is determined, recommending a related image of an artwork to the user according to historical data of the user.

5. The emotion recognition-based artwork recommendation method according to claim 1, wherein the method further comprises: after obtaining the current biometric parameter of the user, verifying validity of an identity of the user according to the current biometric parameter.

6. An electronic device, comprising:
    a body;
    a display device provided on the body configured to display an image of an artwork;
    a biometric feature collection device provided on the body configured to collect a biometric feature parameter of a user;
    a hardware processor;

a memory for storing instructions executable by the hardware processor, wherein the hardware processor is configured to:
before a current biometric parameter of the user is obtained, perform classification training processing on a plurality of biometric parameters of the user in different classifications based on a deep learning algorithm to obtain an emotion classification model;
determine a current emotion type of the user according to the current biometric parameter obtained by the biometric feature collection device by processing the current biometric parameter according to the emotion classification model;
select an image of an artwork corresponding to the current emotion type according to the current emotion type;
recommend the image of the artwork and cause the image of the artwork to be shown to the user in the display device,
perform the classification training processing on the plurality of biometric parameters belonging to the classification based on the deep learning algorithm, so as to obtain a plurality of different emotion classification sub-models correspondingly;
determine a classification of the current biometric parameter, and select a corresponding emotion classification sub-model to process the current biometric parameter according to a classification determination result, so as to determine the current emotion type of the user;
when a plurality of different classifications of current biometric parameters of the user are obtained, record durations in which the user is in different emotion types determined according to the biometric parameters in each classification; and
compare the durations corresponding to the different emotion types, and select an image of an artwork corresponding to an emotion type which corresponds to a maximum one of the durations and recommend the image of the artwork to the user by displaying the image of the artwork on the display screen.

7. The emotion recognition-based artwork recommendation device according to claim 6, wherein the plurality of biometric parameters in different classifications comprise facial feature parameters and sound feature parameters.

8. The emotion recognition-based artwork recommendation device according to claim 7, wherein the hardware processor is further configured to: recommend a selected image of the artwork to the user for display according to a preset time frequency.

9. The emotion recognition-based artwork recommendation device according to claim 7, wherein the hardware processor is further configured to: when no emotion type is determined, recommend a related image of an artwork to the user according to historical data of the user.

10. The emotion recognition-based artwork recommendation device according to claim 6, wherein the further configured to: verify validity of an identity of the user according to the current biometric parameter after the current biometric parameter of the user is obtained.

11. A non-transitory computer-readable storage medium having a computer program stored thereon, wherein, when the program is executed by a processor of an electronic device having a display screen, an emotion recognition-based artwork recommendation method is implemented, wherein the method comprises:
before obtaining a current biometric parameter of a user, performing classification training processing on a plurality of biometric parameters of the user in different classifications based on a deep learning algorithm to obtain an emotion classification model, wherein performing classification training processing on the plurality of biometric parameters based on the deep learning algorithm to obtain the emotion classification model comprises performing the classification training processing on the plurality of biometric parameters belonging to the classification based on the deep learning algorithm, so as to obtain a plurality of different emotion classification sub-models, correspondingly;
obtaining the current biometric parameter of the user;
determining a current emotion type of the user according to the current biometric parameter by performing processing on the current biometric parameter according to the emotion classification model, wherein performing processing on the current biometric parameter according to the emotion classification model to determine the current emotion type of the user comprises:
determining a classification of the current biometric parameter; and
selecting a corresponding emotion classification sub-model to process the current biometric parameter according to a classification determination result, so as to determine the current emotion type of the user;
when a plurality of different classifications of current biometric parameters of the user are obtained, recording durations in which the user is in different emotion types determined according to the biometric parameters in each classification;
selecting an image of an artwork corresponding to the current emotion type according to the current emotion type by:
comparing the durations corresponding to the different emotion types; and
selecting an image of an artwork corresponding to an emotion type which corresponds to a maximum one of the durations; and
recommending an image of the artwork to the user by displaying the image of the artwork on the display screen.

* * * * *